(12) United States Patent
Hanazawa et al.

(10) Patent No.: US 7,161,754 B2
(45) Date of Patent: Jan. 9, 2007

(54) SERVO PATTERN WRITING METHOD AND MAGNETIC DISK DRIVE FOR CARRYING OUT THE SAME

(75) Inventors: Shigeyuki Hanazawa, Odawara (JP); Toshihisa Okazaki, Odawara (JP); Tsutomu Naitou, Hiratsuka (JP); Atsushi Hiruta, Odawara (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 77 days.

(21) Appl. No.: 10/832,819

(22) Filed: Apr. 26, 2004

(65) Prior Publication Data

US 2005/0046993 A1 Mar. 3, 2005

(30) Foreign Application Priority Data

Apr. 30, 2003 (JP) .............................. 2003-125604

(51) Int. Cl.
*G11B 5/09* (2006.01)
(52) U.S. Cl. .......................................... 360/51; 360/75
(58) Field of Classification Search ..................... None
See application file for complete search history.

(56) References Cited

U.S. PATENT DOCUMENTS

| | | | | |
|---|---|---|---|---|
| 5,526,211 A * | 6/1996 | Hetzler | ....................... | 360/135 |
| 5,892,635 A * | 4/1999 | Morita | ..................... | 360/77.02 |
| 6,078,458 A * | 6/2000 | Fioravanti et al. | ........ | 360/73.03 |
| 6,301,087 B1 * | 10/2001 | Combe | ....................... | 360/323 |
| 6,587,293 B1 * | 7/2003 | Ding et al. | ..................... | 360/51 |
| 6,724,562 B1 * | 4/2004 | Ang et al. | ................ | 360/78.04 |
| 6,741,414 B1 * | 5/2004 | Boyd et al. | .............. | 360/73.03 |
| 6,751,041 B1 * | 6/2004 | Codilian et al. | ......... | 360/73.03 |
| 6,791,782 B1 * | 9/2004 | Codilian et al. | ......... | 360/73.03 |

FOREIGN PATENT DOCUMENTS

| | | |
|---|---|---|
| JP | 08-273316 A | 10/1996 |
| JP | 2002-015533 A | 1/2002 |

OTHER PUBLICATIONS

Zone Recording Flexible Diskette Drive Via Microprocessor Control. Apr. 1981. IBM Technical Disclosure Bulletin US vol. No. 23, Issue No. 11; pp. 5068-5069.*

* cited by examiner

*Primary Examiner*—Andrea Wellington
*Assistant Examiner*—Varsha A. Kapadia
(74) *Attorney, Agent, or Firm*—Townsend and Townsend and Crew LLP

(57) ABSTRACT

A servo pattern writing method of writing a servo pattern for the positioning control of a magnetic head on a magnetic disk comprises changing the rotating speed of the magnetic disk with the magnetic head positioned at one or more proper radial positions with respect to the magnetic disk. The rotating speed of the magnetic disk is changed on the basis of the magnitude of a synchronous vibration synchronous with the rotation of the magnetic disk. Writing current for writing a servo pattern is set according to the change of the rotating speed of the magnetic disk. The STW rotating speed is changed according to the change of the radial position of the magnetic head to reduce the intensity of the vibration that is generated during a servo pattern writing operation to a value meeting a positioning level. The servo track writing operation can be achieved at a low cost.

11 Claims, 2 Drawing Sheets

SERVO PATTERN WRITING METHOD AND MAGNETIC DISK DRIVE FOR CARRYING OUT THE SAME

CROSS-REFERENCE TO RELATED APPLICATION

This application claims priority from Japanese Application No. 2003-125604, filed Apr. 30, 2003, the entire disclosure of which is incorporated by reference for all purposes.

BACKGROUND OF THE INVENTION

The present invention relates to a servo track writer capable of writing position information for the positioning control of a magnetic head to a magnetic disk having a metal or glass substrate and incorporated into a magnetic disk drive. The invention relates more particularly to a servo track writer to be applied to a magnetic disk drive for high-density recording.

The following patent documents are referred to below by ordinal number, and are hereby incorporated by reference:
1. Japanese Patent Laid-open No. 9-273316; and
2. Japanese Patent Laid-open No. 2002-15533.

The general magnetic disk drive comprises a head-disk assembly (HDA) for positioning a magnetic head held on the free end of a swing arm supported for turning on a pivot to read magnetic signals from and to write magnetic signals to a magnetic disk having a metal or glass substrate, and an electronic circuit board for controlling the HDA.

A servo pattern signal is recorded in the HDA. The servo pattern, i.e., a magnetic servo pattern, is used for positioning the magnetic head at a multiplicity of concentric tracks formed on the magnetic disk. The servo pattern signal used by recent magnetic disk drives are those of a sector servo system circumferentially intermittently arranged on the entire surfaces of a multiplicity of magnetic disks. According to the sector servo system, servo signals and information are recorded on the same track. Therefore, the magnetic head can accurately be positioned relative to the track. Thus, the sector servo system is suitable for recording data at a high density, increasing recording capacity, and is prevalently employed in general magnetic disk drives.

A description of method of recording a servo pattern signal of the conventional sector servo system follows. The HDA records a servo pattern signal by the magnetic head included therein. In recording the servo pattern signal, the arm holding the magnetic head on its free end is moved to position the magnetic head by using a sensor, such as a laser length-measuring device or an encoder, and the magnetic head thus positioned writes a servo pattern signal in the sector servo system to the magnetic disk. A special device for this purpose is called a servo track writer (hereinafter, abbreviated to "STW").

The rotating speed of the magnetic disk is reduced to the lowest possible extent in writing a servo pattern signal by the conventional STW to write the servo pattern signal accurately. A prior art STW disclosed in, for example, Patent Document 1 writes a servo pattern signal while the magnetic disk is rotating at a speed that causes the magnetic head to float at a height not lower than a lower limit floating height determined from the magnetic head properties. According to Patent Document 1, the rotating speed of the magnetic disk for servo pattern signal writing is lower than a read/write rotating speed at which the magnetic disk is rotated for normal read/write operations. The written servo pattern signal is examined for verification by rotating the magnetic disk at the read/write rotating speed.

A prior art servo pattern signal writing method disclosed in, for example, Patent Document 2 controls the rotating speed of a spindle such that a rotating speed at which the spindle rotates while a servo pattern signal is written to a peripheral part of a magnetic disk is lower than that at which the spindle rotates while a servo pattern signal is written to a radially inner part near the center of the magnetic disk to minimize the difference between the relative speed of the peripheral part of the magnetic disk relative to the magnetic head and that of the radially inner part of the magnetic disk relative to the magnetic head.

[Problem to be Solved by the Invention]

As described above in Patent Document 1, the writing accuracy with respect to the radial direction of the magnetic disk of the STW that rotates the magnetic disk at a rotating speed lower than the read/write rotating speed in writing the servo pattern signal to the magnetic disk was satisfactory while the recording density of the magnetic disk was not very high. However, the level of writing accuracy of the STW has become unsatisfactory as the recording density of the magnetic disks increases year by year. Since the STW requires the magnetic disk to be rotated at a low rotating speed in writing the servo pattern signal to the magnetic disk, the STW takes much time to write the servo pattern signal to the magnetic disk. To complete writing the servo pattern signal in a fixed time, many STWs must be used and thereby the cost of equipment is increased.

The rotating speed at which the magnetic disk is rotated for writing the servo pattern signal to the magnetic disk by the STW (hereinafter, referred to as "STW rotating speed") is determined taking into consideration technical conditions including the floating characteristic of the magnetic head, cost and time needed for the STW to write the servo pattern signal (hereinafter referred to as "STW time"), and the starting characteristic of the spindle motor supported in fluid bearings, to reduce the STW rotating speed with respect to the read/write rotating speed. As regards time required by the STW and the starting characteristic of the spindle motor, higher rotating speeds are advantageous regardless of the radial position of the magnetic head with respect to the magnetic head.

The relation between the floating characteristic of the magnetic head and the radial position of the magnetic head with respect to the magnetic disk is as follows. In conventional techniques including those disclosed in Patent Document 1, the floating characteristic of the magnetic head is a principal factor for determining the rotating speed of the magnetic disk for the operation of the STW. The servo pattern signal is written to the magnetic disk while the magnetic disk is rotated at a fixed, low rotating speed. For example, whereas the read/write rotating speed is 10,000 rpm, the STW rotating speed is 6,000 rpm. However, it has become difficult to position the magnetic head with satisfactory accuracy at a fixed STW rotating speed, such as 6,000 rpm, as head positioning accuracy (writing accuracy) became more precise, and it is necessary to decrease the fixed STW rotating speed to, for example, 5000 rpm, for servo pattern signal writing.

The floating height of the magnetic head has been decreased year by year to increase the areal recording density on the magnetic disk. Consequently, it has become difficult to decrease the rotating speed of the magnetic disk. The read/write rotating speed of the magnetic disk in the HDA has been increased to 10,000 rpm and 15,000 rpm.

Designing the STW is confronted by difficult conditions because the reduction of the rotating speed of the magnetic disk required by the STW, the reduction of the flying height of the magnetic head requiring increase in the rotating speed of the magnetic disk, and increase of the read/write rotating speed of the magnetic disk in the HDA are contradictory requirements.

The prior art technique mentioned in Patent Document 2 is intended for application to writing signals to a flexible disk. The flexible disk is rotated at a comparatively low rotating speed in the range of 2,400 to 3,600 rpm, and signals are written in a comparatively low areal recording density. Nothing is mentioned in Patent Document 2 about the effect of thermal drift due to the rotation of the spindle when the rotating speed of the spindle is high and the areal recording density is high.

SUMMARY OF THE INVENTION

Embodiments of the present invention improve the accuracy in writing a servo pattern signal by a servo track writer (STW), and provide a servo pattern writing method that does not increase STW time.

In one aspect, the present invention provides a servo pattern writing method for the positioning control of a magnetic head on a magnetic disk having a metal or glass substrate, the method comprising changing the rotating speed of the magnetic disk with the magnetic head positioned at one or more proper radial positions with respect to the magnetic disk. In some embodiments, the rotating speed of the magnetic disk is changed on the basis of the magnitude of a vibration synchronous with the rotation of the magnetic disk. In some embodiments, the writing current for writing a servo pattern is set according to the change of the rotating speed of the magnetic disk.

In another aspect, the present invention provides a magnetic disk capable of performing the method in accordance with one or more of the above embodiments. In yet another aspect, the present invention provides an STW capable of performing the method in accordance with one or more of the above embodiments.

In another aspect, the present invention provides a servo pattern writing method for the positioning control of a magnetic head on a magnetic disk having a metal or glass substrate, the method comprising: for a first range of radial magnetic head positions, rotating the magnetic disk at a first rotating speed while writing the servo pattern; at the end of the first range, changing the rotating speed from the first rotating speed to a second rotating speed that is different from the first rotating speed; and for a second range of radial magnetic head positions, rotating the magnetic disk at the second rotating speed while writing the servo pattern. In some embodiments, the first rotating speed and the second rotating speed are selected to maintain a magnitude of synchronous vibration below a predetermined synchronous vibration level.

A further understanding of the nature and advantages of the present invention may be realized by reference to the remaining portions of the specification and the drawings.

DESCRIPTION OF SPECIFIC EMBODIMENTS

Figure 1:
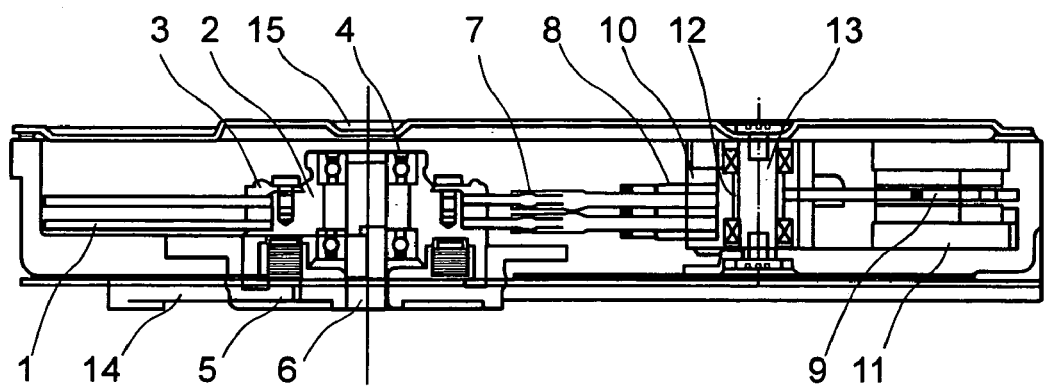
FIG. 1 is a sectional view of a magnetic disk drive for carrying out a servo pattern writing method in a preferred embodiment according to the present invention.

FIG. 1 is a sectional view of a magnetic disk drive for carrying out a servo pattern writing method in a preferred embodiment according to the present invention. A head-disk assembly (HDA) broadly includes a spindle unit, an actuator unit and a casing unit. The spindle unit comprises magnetic disks 1 each having a metal or glass substrate and capable of recording servo pattern signals and data, a disk clamp 3 for fastening the magnetic disks 1 to a rotating member 2 included in the spindle unit, spindle bearings 4 supporting and fixing the rotating member 2, a spindle fixing member 5 supporting the rotating member, and a rotating shaft 6 fixing the spindle unit.

The actuator unit has a carriage unit 10 including arms 8 holding magnetic heads 7 at their free ends and a coil 9, a voice coil motor 11 for operating the carriage unit 10, pivot bearings 12 fixedly supporting the carriage unit 10, and a pivot shaft 13. The casing unit has a base 14 and a cover 15. The spindle unit and the actuator unit are fixedly contained and sealed in the casing unit.

Figure 2:
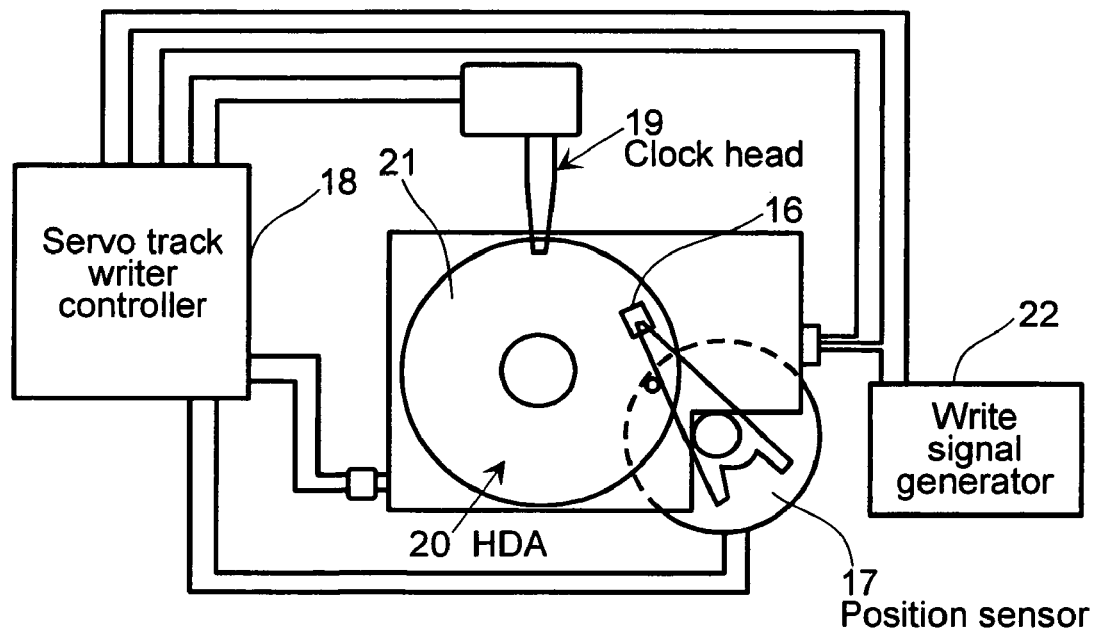
FIG. 2 is a diagrammatic view of a servo track writer (STW) of the preferred embodiment.

FIG. 2 is a diagrammatic view of a servo track writer (STW) for writing a servo pattern to the magnetic disk related to the preferred embodiment. FIG. 2 shows the servo track writer, the radial position, i.e., a position on a radius of a magnetic disk, of a magnetic head 16 is determined through the detection of operation of an actuator supporting magnetic head 16 and the magnetic head 16 held at a specified radial position by a position sensor 17, such as a He—Ne laser system, a rotary encoder or the like, for moving magnetic head 16 to a desired position. Position information, such as a periodic clock signal recorded on the periphery of the disk, about the angular position of magnetic head 16 is written to a magnetic disk 21 included in an HDA 20 with a clock head 19 under the control of a servo track writer controller 18. A write signal generator 22 sends servo pattern data to magnetic head 16 according to the position information to write the servo pattern data to magnetic disk 21. A clock signal may be written to magnetic disk 21 by using writing magnetic head 16 instead of clock head 19 shown in FIG. 2.

Principal causes of vibrations that are generated during a servo pattern writing operation by a current method are described prior to the description of the servo pattern writing method embodying the present invention. Principal vibrations that are generated during a servo pattern writing operation include first vibrations in an actuator system attributable to the vibrations of the magnetic head and the arm, second vibrations due to the vibrations of a sensor for positioning the magnetic head at a desired position on the magnetic disk and errors in the operation of the sensor, third vibrations, i.e., fluttering vibrations due to the fluttering of a magnetic disk rotating at a high rotating speed, fourth vibrations due to the resonance of the spindle bearings and the STW, and fifth vibrations of the base of the HDA due to the insufficient rigidity of the base and the cover.

The vibration of the magnetic head and the magnetic disk synchronous with the rotation of the magnetic disk, principally, a radial vibration (hereinafter, referred to as "synchronous vibration"), adversely affects head positioning accuracy and writing accuracy, which is an impediment to increasing track density. Such synchronous vibration is caused by the combined effect of those five kinds of vibrations.

Generally, the intensity of the synchronous vibration is dependent on the radial position of the magnetic head when the rotating speed of the disk is fixed. The synchronous vibration is particularly conspicuous in arm disturbance (arm vibrations included in the first vibrations) due to wind generated by the rotating spindle bearing, and a vibration (the fourth vibrations) dependent on the construction of the STW and the construction of the HDA. Generally, the synchronous vibration is more intense when the magnetic head is nearer to the periphery of the magnetic disk and is less intense when the magnetic head is nearer to the center of the magnetic disk. Thus, the present invention designs the floating characteristic of a magnetic head on the basis of synchronous vibrations generated with the magnetic head at different radial positions to determine an optimum STW rotating speed in order that positioning accuracy is optimized and STW time is shortened, which will be described later.

Figure 4:
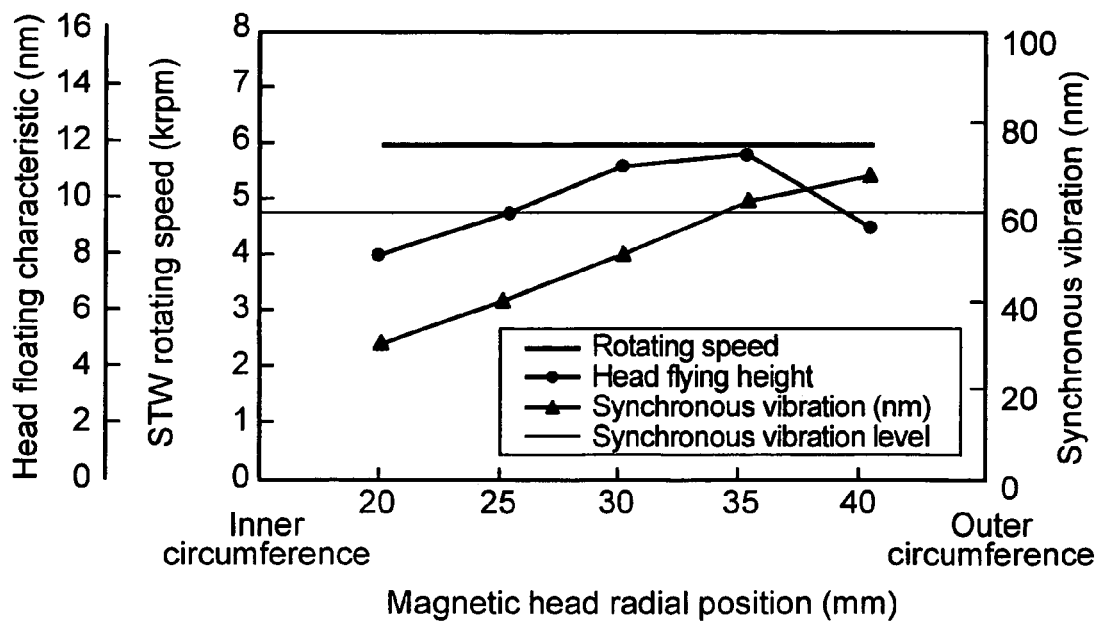
FIG. 4 is a graph showing the dependence of STW rotating speed, head floating characteristic and synchronous vibration on the radial position of a magnetic head with respect to a disk of the prior art.

FIG. 4 is a graph showing the dependence of STW rotating speed, head floating characteristic and synchronous vibration on the radial position of a magnetic head with respect to a disk in prior art, and illustrates conventional method of setting a STW rotating speed is described prior to the description of a method of setting a STW rotating speed relating to the embodiment of the present invention. As can be seen from FIG. 4, the floating characteristic of the magnetic head varies with the radial position of the magnetic head for a fixed rotating speed. As mentioned above, the prior art method of determining a STW rotating speed determines a STW rotating speed from the floating characteristic of the magnetic head, taking into consideration the lowest flying height to ensure the least flying height. On the other hand, magnetic head positioning accuracy subject to vibrations generated when the STW operates for writing (caused by synchronous vibration) is greatly dependent on the radial position of the magnetic head as mentioned above. Synchronous vibration must meet a specific synchronous vibration level dependent on the construction of the magnetic disk drive (in FIG. 4, the specific synchronous vibration level is fixed regardless of the radial position of the magnetic head.

In writing a servo pattern to a magnetic disk by a magnetic head having floating characteristics as shown in FIG. 4, it has been the usual practice to rotate the magnetic disk at a fixed lowest rotating speed, for example, of 6,000 rpm, regardless of the radial position of the magnetic head. The fixed lowest rotating speed, for example, of 6,000 rpm, has been determined by a method of determining the lowest possible rotating speed at which the magnetic head does not come into contact with the disk. When the rotating speed is determined under such a setting condition, the synchronous vibration that dominates positioning accuracy is sufficiently satisfactory compared to the specific synchronous vibration level while the magnetic head is positioned near the inner circumference of the disk as shown in FIG. 4. However, the synchronous vibration is barely satisfactory or unsatisfactory while the magnetic head is positioned near the outer circumference of the disk. When the STW writes the servo pattern with the magnetic disk rotated at 6,000 rpm throughout, the STW takes a long time to write the servo pattern to the magnetic disk.

Figure 3:
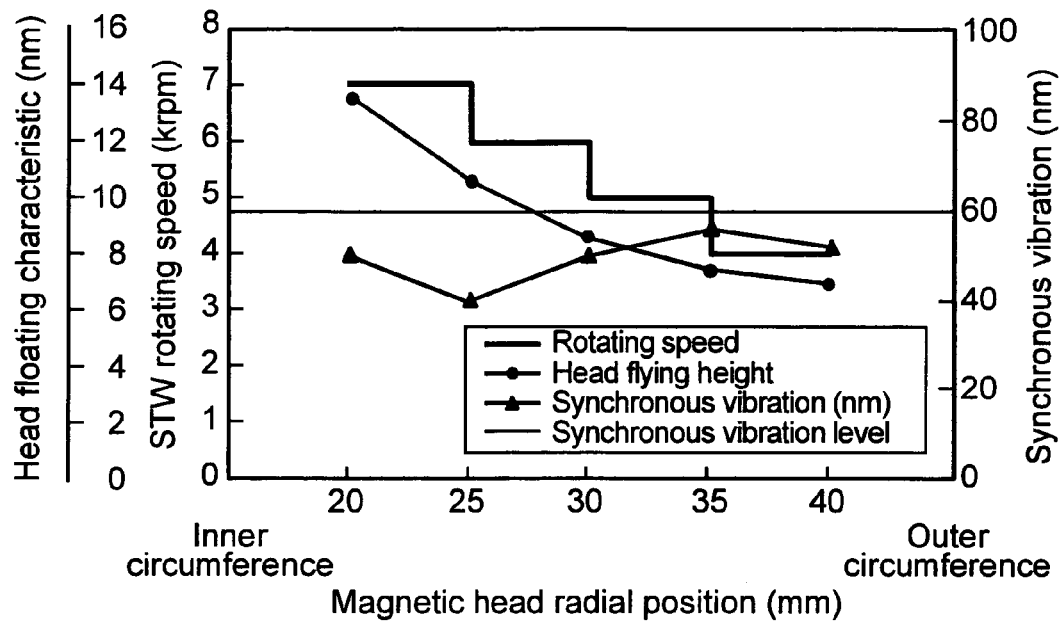
FIG. 3 is a graph showing the dependence of STW rotating speed, head floating characteristic and synchronous vibration on the radial position of a magnetic head with respect to a disk in a preferred embodiment of the present invention.

FIG. 3 is a graph showing the dependence of STW rotating speed, head floating characteristic and synchronous vibration on the radial position of a magnetic head with respect to a disk in the preferred embodiment of the present invention, and illustrates the servo pattern writing method embodying the present invention. As shown in FIG. 3, when the magnetic head is near the inner circumference of the magnetic disk and conditions on magnetic head positioning accuracy and synchronous vibration are satisfied, the STW rotating speed is increased to, for example, 7,000 rpm for servo pattern writing, and the STW rotating speed of the magnetic disk is decreased stepwise to a lower limit STW rotating speed of 4,000 rpm as the magnetic head moves toward the outer circumference of the magnetic disk.

As a consequence of the servo pattern writing operation in such a mode, the adverse effect of the synchronous vibration with the magnetic head positioned near the inner circumference of the magnetic disk becomes higher than that which is experienced by the prior art, but is still lower than the specific synchronous vibration level. In other words, the lower limit STW rotating speed is determined by increasing the rotating speed to a level at which the synchronous vibration with the magnetic head positioned near the inner circumference of the magnetic disk is below the specific synchronous vibration level. Since the STW rotating speed can be decreased as the magnetic head moves toward the outer circumference of the magnetic disk, the synchronous vibration can be reduced. Thus, the synchronous vibration can be kept below the specific synchronous vibration level, which could not be achieved by the prior art. If the specific synchronous vibration level can further be raised, the STW rotating speed can be changed in more steps, for example 8,500 rpm and 7,000 rpm for conditions where the magnetic head is at the inner circumference of the magnetic disk and at a middle radial position, respectively, to reduce the STW time.

The positioning accuracy (synchronous vibration) can be satisfied for the entire moving range of the magnetic head from the inner to the outer circumference of the magnetic disk and the STW time can be reduced by thus changing the STW rotating speed during the servo pattern writing operation.

The floating characteristic of the magnetic head when the STW rotating speed is changed may be designed as shown in FIG. 3. An explanation of the floating characteristic follows. The floating characteristic of the magnetic head signifies the mode of change of the flying height of the magnetic head with the variation of the STW rotating speed and the radial position of the magnetic head with respect to the disk. Generally, the complete HDA operates for a read/write operation at a fixed read/write rotating speed of, for example, 10,000 rpm or 15,000 rpm (does not operate at different speeds). Therefore, the conventional magnetic head is designed to exercise optimum performance at the read/write rotating speed. The magnetic head embodying the present invention is preferably designed taking into consideration the "rotating speed" and "radial position with respect to the disk" of the magnetic head to reduce synchronous vibration and shorten STW time. This can be achieved by adjusting parameters including the shape of the slider of the magnetic head, the angular positions (hereinafter, referred to as "yaw angles") of the magnetic head at radial positions, and the force of the spring of the magnetic head suspension.

Technical problems in the STW embodying the present invention are now explained. These problems relate to thermal expansion, changes in the required write current, and possible loss of positioning accuracy when the rotating speed is changed. These problems resulting from changing the rotating speed can be addressed and solved by the following method.

The first problem is the need to interrupt the servo pattern writing operation for several seconds when rotating speed is changed during the servo pattern writing operation because the rotating speed is changed only at that position and, consequently, it is possible that the servo pattern is written at an incorrect radial position due to the thermal expansion of the magnetic disk.

Thermal expansion is due to the effect of heat generated by the spindle motor when it is operated. Thermal stabilization will be reached after a certain minimum duration of operation of the spindle motor. A representative minimum duration is 5 minutes, but this can vary from HDA to HDA. In any event, the discussion will be in terms of a minimum duration of 5 minutes. Therefore, the change of rotating speed may be suspended for a time and the rotating speed may be changed after the heat effect disappears. The suspension time for changing the rotating speed is 5 minutes or longer after the start of the spindle motor. In other words, the heat effect can be avoided by changing the rotating speed 5 minutes or longer after starting the spindle motor or by operating only the spindle motor before starting the servo pattern writing operation. Referring to FIG. 3, the spindle motor must have been operating 5 minutes or longer immediately before reducing the rotating speed from 7,000 rpm to 6,000 rpm. The rotating speed is changed after thermal stabilization.

A second problem is the need to change the current (hereinafter, referred to as the "write current") supplied to the head (hereinafter, referred to as the "write head") when the floating characteristic of the write head changes. Changing the write current during the servo pattern writing operation is now described. If the rotating speed is fixed during the servo pattern writing operation, an optimum write current may be determined to conform to the fixed rotating speed. As mentioned above, in some cases, according to the present invention, the write current needs to be changed according to the STW rotating speed when the STW rotating speed is changed. (The flying height changes according to the rotating speed and hence the write current must be changed accordingly. More specifically, the write current decreases when the flying height decreases).

The write current should be examined at every STW rotating speed and the write current will typically need to be changed. The write current may be changed simultaneously with the change of the rotating speed according to software stored beforehand in the STW. (The relation between the rotating speed and the flying height and the relation between the flying height and the write current are determined beforehand, and the write current is changed properly when the rotating speed is changed.)

A third problem is the deterioration of accuracy in positioning the write head at a track when the rotating speed is changed with the write head at a position corresponding to the track. The continuation of the servo pattern between a track at which the write head is positioned when the rotating speed is changed, and tracks adjacent to that track is deteriorated by the change of the rotating speed. The STW is able to specify the track that deteriorated the continuation of the servo pattern because the STW knows the number of the track at which the rotating speed is changed. Therefore, problems that may arise from the discontinuation of the servo pattern can be solved by registering the track where the rotating speed is changed and the one or more neighboring tracks in each direction, as ineffective tracks in a step subsequent to STW operation. This may entail, for example, in registering three tracks (the track in question and its immediate neighbors). The magnetic disk of a magnetic disk drive typically has 10,000 or more tracks, and the elimination of the three tracks does not substantially affect the capacity of the magnetic disk.

The STW writes the servo pattern tentatively to those three tracks before and after the change of the rotating speed. It is possible that the servo pattern is not accurately written to those tracks because the servo pattern is written to those tracks while the rotating speed is being changed and hence the servo pattern written to those tracks may possibly cause a problem during a read/write operation. Therefore, the servo pattern recorded in a data region corresponding to those three tracks is registered as an ineffective servo pattern. The number of tracks to be registered as ineffective tracks may be any number other than three and may be determined empirically.

Thus, the magnetic disk drive and the magnetic disk embodying the present invention register several tracks as ineffective tracks every time the rotating speed is changed stepwise. In the example shown in FIG. 3, the STW changes the rotating speed three times and, for example, three tracks corresponding to the change of the rotating speed are identified by a striped pattern and are registered as ineffective tracks. Thus, the registered ineffective parts of the magnetic disk can visually be recognized.

As apparent from the foregoing description, the servo pattern writing method and the STW embodying the present invention determine STW rotating speeds conforming to the synchronous vibration level for the respective radial positions of the magnetic head with respect to the magnetic disk, and design the floating characteristic of the magnetic head for the radial positions of the magnetic head with respect to the magnetic disk to optimize the STW rotating speed and to optimize the floating characteristic of the magnetic head. More specifically, taking into consideration different synchronous vibrations directly related to servo pattern writing accuracy, depending on the radial position of the magnetic head with respect to the disk, the servo pattern writing method and the STW embodying the present invention rotate the magnetic disk at a low rotating speed to write a servo pattern to the magnetic disk when the magnetic head is at a radial position where an intense synchronous vibration is generated, and change the low rotating speed for servo pattern writing stepwise when the magnetic head is at radial positions where the adverse effect of the synchronous vibration is insignificant.

The servo pattern writing method of the present invention does not require any modification or any change in the STW or the HDA, and is capable of improving head positioning accuracy, of reducing STW time, and of reducing the cost of writing a servo pattern. Thus the present invention is capable of improving the head positioning accuracy required by further increase in the recording density of the magnetic disk drive.

While the above is a complete description of specific embodiments of the invention, the above description should not be taken as limiting the scope of the invention as defined by the claims.

What is claimed is:

1. A servo pattern writing method of writing a servo pattern for positioning control of a magnetic head on a magnetic disk having a metal or glass substrate, the method comprising:
changing a rotating speed of the magnetic disk by decreasing in steps while the magnetic head is positioned at any one of plurality of radial positions from inner circumference to outer circumference of the magnetic disk,
registering several tracks as ineffective in connection with changing the rotating speed of the magnetic disk.

2. The method of claim 1 wherein the radial positions are a plurality of positions including one position, and the rotating speed of the magnetic disk is changed on the basis of the magnitude of a synchronous vibration synchronous with the rotation of the magnetic disk.

3. The method of claim 1 wherein writing current for writing a servo pattern is set according to the change of the rotating speed of the magnetic disk.

4. The method of claim 1 wherein the rotating speed of the magnetic disk is changed only after the magnetic disk has been rotating for at least a predetermined minimum time immediately before the change in rotating speed.

5. The method of claim 1 wherein the radial positions are a plurality of positions including one position, and the rotating speed of the magnetic disk is changed on the basis of the magnitude of a synchronous vibration synchronous with the rotation of the magnetic disk.

6. A servo pattern writing method of writing a servo pattern for positioning control of a magnetic head on a magnetic disk having a metal or glass substrate, the method comprising:
for a first range of radial magnetic head positions, rotating the magnetic disk at a first rotating speed while writing the servo pattern;
at the end of the first range, changing the rotating speed from the first rotating speed to a second rotating speed that is different from the first rotating speed;
for a second range of radial magnetic head positions, rotating the magnetic disk at the second rotating speed while writing the servo pattern; and
changing a writing current in connection with changing the rotating speed from the first rotating speed to the second rotating speed,
wherein at least three tracks are registered as ineffective in connection with changing the rotating speed of the magnetic disc.

7. The method of claim 6 wherein the first rotating speed and the second rotating speed are selected to maintain a magnitude of synchronous vibration below a predetermined synchronous vibration level.

8. The method of claim 6, and further comprising requiring that the magnetic disk has been rotating for at least a predetermined time immediately before changing the rotating speed.

9. The method of claim 6, and further comprising registering at least one track at a border between the first and second ranges as ineffective in connection with changing the rotating speed.

10. A servo pattern writing method of writing a servo pattern for the positioning control of a magnetic head on a magnetic disk having a metal or glass substrate, the method comprising:
changing the rotating speed of the magnetic disk while the magnetic head is positioned at any one of a plurality of radial positions with respect to the magnetic disk;
wherein writing current for writing a servo pattern is set according to the change of the rotating speed of the magnetic disk,
registering several tracks as ineffective in connection with changing the rotating speed of the magnetic disk.

11. The method of claim 5 wherein the rotating speed of the magnetic disk is changed only after the magnetic disk has been rotating for at least a predetermined minimum time immediately before the change in rotating speed.

* * * * *